(12) United States Patent
Mitsuno (10) Patent No.: US 8,275,473 B2
(45) Date of Patent: Sep. 25, 2012

(54) DATA RECORDING AND REPRODUCING APPARATUS, METHOD OF RECORDING AND REPRODUCING DATA, AND PROGRAM THEREFOR

(75) Inventor: Makoto Mitsuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 870 days.

(21) Appl. No.: 11/529,868

(22) Filed: Sep. 29, 2006

(65) Prior Publication Data

US 2007/0179649 A1 Aug. 2, 2007

(30) Foreign Application Priority Data

Sep. 30, 2005 (JP) ................ P2005-285997

(51) Int. Cl.
G06F 17/00 (2006.01)
(52) U.S. Cl. ......................................... 700/94
(58) Field of Classification Search ............ 700/94; 704/500–504; 84/612
See application file for complete search history.

(56) References Cited

U.S. PATENT DOCUMENTS

| | | | | |
|---|---|---|---|---|
| 5,870,397 A * | 2/1999 | Chauffour et al. | ............ | 370/435 |
| 5,995,153 A * | 11/1999 | Moeller et al. | ........... | 375/240.01 |
| 6,232,540 B1 * | 5/2001 | Kondo | ............... | 84/612 |
| 7,079,905 B2 * | 7/2006 | Chang | ............... | 700/94 |
| 7,107,111 B2 * | 9/2006 | Van De Kerkhof et al. | .... | 700/94 |
| 7,236,837 B2 * | 6/2007 | Matoba | ............... | 700/94 |
| 7,260,439 B2 * | 8/2007 | Foote et al. | ............... | 700/94 |
| 2001/0047267 A1 | 11/2001 | Abiko et al. | | |
| 2007/0137464 A1 * | 6/2007 | Moulios et al. | ............... | 84/612 |
| 2009/0006102 A1 * | 1/2009 | Kan et al. | ............... | 704/500 |

FOREIGN PATENT DOCUMENTS

| | | |
|---|---|---|
| EP | 1271359 A2 | 1/2003 |
| EP | 1578141 A1 | 9/2005 |
| JP | 08-249000 A | 9/1996 |
| JP | 10-247093 A | 9/1998 |
| JP | 10-285046 A | 10/1998 |
| JP | 2000-100072 A | 4/2000 |
| JP | 2001-344905 A | 12/2001 |
| JP | 2002-215192 A | 7/2002 |
| JP | 2003-242717 A | 8/2003 |
| JP | 2006-107687 A | 4/2006 |
| WO | 03075262 A1 | 9/2003 |
| WO | 2005057581 A1 | 6/2005 |

OTHER PUBLICATIONS

European Search Report EP 06255034, dated Mar. 28, 2012.

* cited by examiner

*Primary Examiner* — Andrew C Flanders
(74) *Attorney, Agent, or Firm* — Lerner, David, Littenberg, Krumholz & Mentlik, LLP

(57) ABSTRACT

A data recording and reproducing apparatus is adapted to receive audio data created by encoding an original sound signal and to decode the audio data into the original sound signal to thereby reproduce the original sound signal. The data recording and reproducing apparatus includes a data storage unit operable to store the audio data; a feature point information creation unit operable to create information about feature points by extracting information about characteristics of sound indicated by the original sound signal from the stored audio data and to create feature point information based on the extracted information; and an altered-speed reproduction unit operable to reproduce the original sound signal at an altered speed by decoding the audio data and thinning out the decoded audio data based on the feature point information.

9 Claims, 5 Drawing Sheets

DATA RECORDING AND REPRODUCING APPARATUS, METHOD OF RECORDING AND REPRODUCING DATA, AND PROGRAM THEREFOR

CROSS-REFERENCE TO RELATED APPLICATIONS

The present application claims priority from Japanese Patent Application No. JP 2005-285997 filed on Sep. 30, 2005, the disclosure of which is hereby incorporated by reference herein.

BACKGROUND OF THE INVENTION

1. Field of the Invention

The present invention relates to data recording and reproducing apparatus, data recording and reproducing method, and program therefor capable of receiving audio data created by encoding an original sound signal and decoding the audio data back to the original sound signal to thereby reproduce the original sound signal.

2. Description of the Related Art

As digital consumer electronics and personal computers have spread in recent years, a usage including recording analog TV broadcasts, digital TV broadcasts, radio broadcasts, and others on recording media in the form of disks or cards and reproducing them is enjoying wider acceptance. Under these circumstances, there is an increasing demand for capabilities of viewing and listening to recorded contents in shorter times. In response to the demand, various kinds of variable speed reproduction methods have been devised. In one method, data about video or audio are thinned out at simple constant intervals. In another method, data are thinned out at non-constant intervals corresponding to features possessed by video and audio contents.

A digest reproduction technique is disclosed which plays back summarized contents at high speed by classifying reproduced data having a title to be reproduced into 3 kinds of intervals: for example, silent interval, musical signal interval, and vocal signal interval, according to features possessed by sounds of the reproduced contents, and reproducing the contents while selecting vocal signal intervals preferentially (see, for example, patent reference 1). In this patent reference 1, a technique for performing FFT (fast Fourier transform) processing before the audio input signal is compressed and encoded is proposed. In particular, energies in frequency bands are observed. Features in the subintervals are classified. Furthermore, patent reference 1 proposes a technique for classifying features possessed by subintervals by decoding data encoded by MPEG (Moving Picture Experts Group) audio technology to create subband data and observing energies possessed by the subbands.

In the method described in this patent reference 1, when an analog audio input signal, for example, is simply encoded, multiplexed with the video signal, and recorded on a recording medium such as a hard disk, feature points of the contents can be extracted. When summarized contents are reproduced later, information about the feature points can be utilized. Alternatively, when a digital multiplexed data stream sent in, for example, by a digital broadcast may be once separated and decoded. The resulting data may be reencoded and remultiplexed. Then, the data are recorded on a recording medium. At this time, feature points of the contents may be extracted and stored. When summarized contents are reproduced later, information about the feature points may be utilized.

In the method of JP-A-10-247093 (paragraphs [0008] and [0009]), however, the following problem occurs in a case where a digital multiplexed data stream sent in by a digital broadcast is once separated and decoded. The resulting data are reencoded and remultiplexed, and then recorded on a recording medium. Where features of voice are classified from encoded audio data, the amount of computation is increased because the data are decoded and subband data are created. This increases the burden on the apparatus.

Furthermore, in the method of JP-A-10-247093, another problem takes place in a case where other data (e.g., a different TV program) on a recording medium are reproduced while a digital multiplexed data stream sent in, for example, by a digital broadcast is concurrently being recorded on the recording medium without modifying the format. In the method of JP-A-10-247093, the data stream is decoded to extract feature points. During reproduction, the decoder is occupied by the processing for decoding the stream of the other data. Therefore, it may be impossible to extract feature points possessed by the currently recorded contents in real time. Consequently, there is the problem that where summarized contents of the recorded data are reproduced, it may not be possible to perform digest reproduction corresponding to the features possessed by the contents.

The "digest reproduction" referred to above means that summarized contents of data are reproduced. In addition, the "digest reproduction" means that contents are partially omitted and reproduced in a shorter time than usual.

In view of the foregoing circumstances, it is desirable to provide data recording and reproducing apparatus, data recording and reproducing method, and program therefor capable of extracting feature points of the contents of data without increasing the amount of computation.

It is also desirable to provide a technique which, when other data are being reproduced during recording of audio data, is capable of extracting feature points of the contents of the data being recorded.

SUMMARY OF THE INVENTION

A data recording and reproducing apparatus associated with one embodiment of the present invention is adapted to receive audio data, which have been created by encoding an original sound signal, and to decode the audio data into the original sound signal to thereby reproduce it. The data recording and reproducing apparatus includes data storage means for storing the audio data; feature point information creation means for creating information about feature points by extracting information about characteristics of sound indicated by the original sound signal from the stored audio data and by creating feature point information based on the extracted information; and altered-speed reproduction means for reproducing the original sound signal at an altered speed by decoding the audio data and thinning out the decoded audio data based on the feature point information.

In this embodiment of the present invention, information about the characteristics of sound indicated by the original sound signal is extracted from the encoded audio data. Information about feature points is created based on the extracted information about the characteristics without having to perform a decoding operation. This reduces the amount of computation compared with the related art technique. In addition, even if other data recorded in the past are being reproduced, feature points of data contents being recorded currently can be extracted.

In particular, if the codec for encoding uses MPEG1, MPEG2, or the like, "feature point information" indicating sound pressure level in each frequency band is "scale factor (hereinafter abbreviated SF)". Where the codec is the Dolby Digital (AC (audio code)-3) system, the "feature point information" indicating sound pressure level in each frequency band is "exponents". Examples of "information about characteristics of sound" include sound pressure level, frequency, and phase.

The "original sound signal" means an analog-like signal that a person can perceive or a digital signal obtained by encoding the analog signal up to PCM (pulse code modulation). The processing for encoding (compressive encoding) of the original sound signal is not always done by the present data recording and reproducing apparatus. For example, it is also conceivable that the analog signal has been previously encoded by an external device or that the analog signal has been previously encoded such as contents of digital broadcasts.

More specifically, the data recording and reproducing apparatus can further include reproduction means for reproducing the original sound signal by reading the audio data from the data storage means and reproducing the original sound signal at normal speed while decoding the audio data; and a buffer controller operable to provide parallel control of reading of the audio data and storing of the feature point information.

When the original sound signal is reproduced at an altered speed by the altered-speed reproduction means, the feature point information may be created in real time by the feature point information creation means. Alternatively, the feature point information may be stored by a feature point information storage means and then the stored feature point information may be used during reproduction at an altered speed as described later.

In this embodiment of the invention, when an original sound signal is reproduced, it may only be required that a person can catch the original sound. Of course, the concept of the present invention embraces the case where the original sound is not completely reconstructed by decoding. That is, the codec process according to an embodiment of the present invention can be reversible or irreversible. Any kind of codec process can be used as long as information about the characteristics of sound indicated by the original sound signal are left in the audio signal obtained by encoding the original sound signal, even if the signal is not decoded.

The "data storage means" may be any medium if it can store data. Examples of the data storage means include magnetic disks (such as a hard disk), solid-state memories using a semiconductor or dielectric substance, CD (compact disc), DVD (digital versatile disc), Blu-ray Disc, other optical disc capable of recording data by an optical method such as holography, MO (magnetooptical disc), MD (MiniDisc), and other magnetooptical discs. Similar conventions apply to every storage device described hereinafter.

Of course, it is assumed that the feature point information creation means can extract information about characteristics from either an analog signal or from a digital signal and create feature point information.

In the embodiment of the present invention, the feature point information creation means creates information about the presence or absence of the sound as the feature point information. In this case, the altered-speed reproduction means can perform reproduction at an altered speed while preferentially picking up portions where there is sound, for example. The feature point information may include information about the presence or absence of a human voice. Thus, the altered-speed reproduction means can perform reproduction at an altered speed such that only a human voice, for example, is picked up.

In the embodiment of the present invention, the feature point information creation means creates the feature point information at regular intervals of time. In the embodiment of the invention, in a case where audio is reproduced together with video, for example, if the "regular intervals" are shortened, there arises the advantage that it seems to the user that video and audio are synchronized better during reproduction at an altered speed, thus reducing the feeling of oddness given to the user. Conversely speaking, if the interval is a relatively short time such as 10 seconds, 30 seconds, or 1 minute, less feeling of oddness will be given to the user if video and sound are not synchronized. That is, if audio is interrupted, a feeling of oddness is created. In almost every case, video varies constantly. It may only be required that video and audio be synchronized to some extent in each given time. Conversely speaking, where audio is picked up such that the user can clearly hear it and the image in that interval is displayed fully without bringing the video into synchronization with the audio, the video may be easy for the user to see.

In one embodiment of the present invention, the data recording and reproducing apparatus further includes feature point information storage means for storing the created feature point information in a corresponding manner to the audio data having the characteristic information corresponding to the feature point information. The feature point information creation means may create feature point information before encoded audio data are stored in the data storage means. Alternatively, the feature point information creation means may create feature point information while reading audio data from the data storage means after encoded audio data are stored in the data storage means. In this case, feature point information may be subsequently stored in the feature point information storage means.

The "feature point information storage means" and the data storage means may share the same physical storage medium, or they may be different storage media.

A data recording and reproducing method according to one embodiment of the present invention is adapted to receive audio data, which have been created by encoding an original sound signal, and to reproduce the audio data by decoding the audio data into the original sound signal, and includes storing the audio data; extracting information about characteristics of sound indicated by the original sound signal from the stored audio data; creating feature point information based on the extracted information; decoding the audio data; and thinning out the decoded audio data based on the feature point information to thereby reproduce the original sound signal at an altered speed while using the created feature point information.

As described so far, according to embodiments of the present invention, feature points of data contents being recorded can be extracted without increasing the amount of computation even if other data are being reproduced during the recording of the audio data.

DETAILED DESCRIPTION

Embodiments of the present invention are hereinafter described with reference to the drawings.

Figure 1:
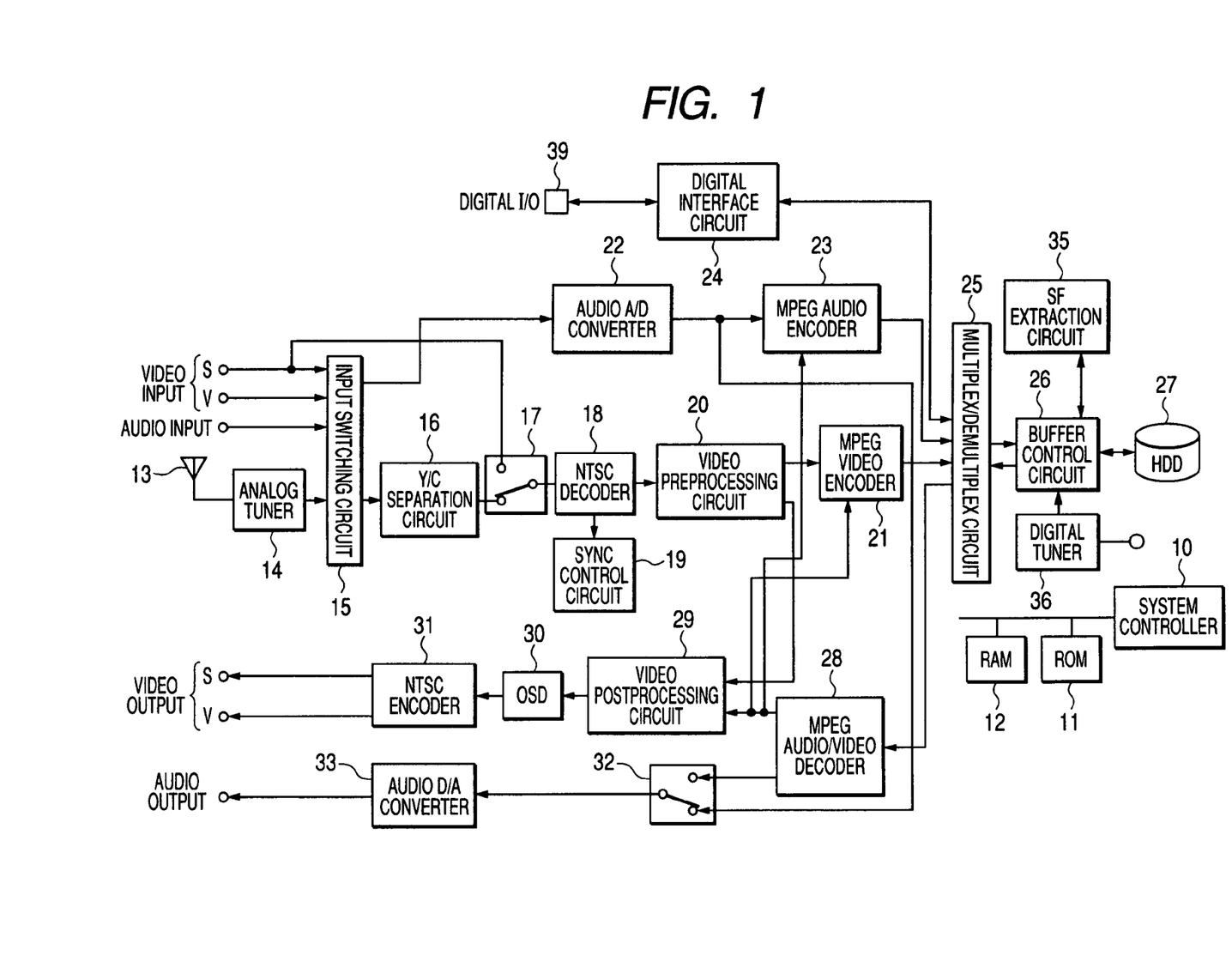
FIG. 1 is a block diagram showing the configuration of a data recording and reproducing apparatus associated with one embodiment of the present invention.

FIG. 1 is a block diagram showing the configuration of a data recording and reproducing apparatus associated with one embodiment of the present invention. This data recording and reproducing apparatus 100, is an apparatus capable of recording analog TV broadcasts, digital TV broadcasts, and other broadcasts and reproducing recorded data.

A system controller 10 controls various blocks of the data recording and reproducing apparatus 100. The system controller 10 gains access to a ROM (read only memory) 11 and to a RAM (random access memory) 12 via a host bus according to the need, thus controlling the whole apparatus.

It is now assumed that an analog broadcast signal is supplied via an analog tuner 14. Some blocks are used when such analog broadcasts are recorded. The blocks and their functions are described below.

The analog tuner 14 supplies video and audio signals to an input switching circuit 15, the signals being entered via an antenna 13. The input switching circuit 15 is also supplied with a composite video signal and an audio signal from the outside. The input switching circuit 15 supplies the composite video signal to a Y/C separation circuit 16 and the audio signal to an audio A/D (analog/digital) converter 22 under control of the system controller 10.

The Y/C separation circuit 16 performs Y/C separation of the composite video signal and supplies the Y/C output to a switching circuit 17. The switching circuit 17 selects either an S-video signal from the outside or the output from the Y/C separation circuit 16 under control of the system controller 10. The selected video signal is supplied to an NTSC (National Television System Committee) decoder 18.

The NTSC decoder 18 performs A/D conversion and chroma encoding of the supplied video signal, converts the video signal into digital-component video data (hereinafter referred to as the video data), and supplies the video data to a video preprocessing circuit 20. The NTSC decoder 18 also supplies a clock signal, horizontal and vertical sync signals, and a field discrimination signal to a sync control circuit 19. The clock signal is created based on the horizontal sync signal of the supplied video signal. The horizontal and vertical sync signals are obtained by synchronous separation. The sync control circuit 19 creates clock and sync signals created based on those signals such that clock and sync signals are appear at timing necessary for blocks (described later) The clock and sync signals are supplied to the blocks.

The video preprocessing circuit 20 performs various video processing tasks on the supplied video data such as pre-filtering and supplies the processed video data to an MPEG (Moving Picture Experts Group) video encoder 21 and to a video postprocessing circuit 29.

The MPEG video encoder 21 encodes or otherwise processes (such as block DCT (discrete cosine transform)) the video data from the video preprocessing circuit 20, creates video elementary stream (ES), and supplies the video ES to a multiplex/demultiplex circuit 25. In the present embodiment, an MPEG compression method is used but other compression method can also be used.

On the other hand, the audio A/D converter 22 converts the audio signal selected by the input switching circuit 15 into digital audio data and supplies the audio data to an MPEG audio encoder 23 and to a switching circuit 32. The MPEG audio encoder 23 compresses the audio data from the audio A/D converter 22 according to an MPEG format and then creates an audio ES stream and supplies it to the multiplex/demultiplex circuit 25.

In the description of the present embodiment provided so far, video and audio data are compressed according to an MPEG format. Alternatively, they may also be compressed according to other compression format or may be left uncompressed.

The multiplex/demultiplex circuit 25 multiplexes video ES, audio ES, and various control signals to create a transport stream (TS), and supplies it to a buffer control circuit 26. The buffer control circuit 26 provides control such that the continuously entered TS is sent in packets to a following stage of HDD (hard disc drive) 27. For example, where the buffer control circuit 26 can temporarily store the TS in a buffer (not shown) because writing of the TS is not allowed during seek operation of the HDD 27, and if writing is possible, the TS is written into the HDD 27 at a rate higher than the input rate. Consequently, the continuously entered TS can be recorded on the HDD 27 without interruption. The HDD 27 records the TS in a given address under control of the system controller 10.

An SF (scale factor) extraction circuit 35 parses the TS sent to the HDD 27 from the multiplex/demultiplex circuit 25 via the buffer control circuit 26, extracts the SF in the MPEG audio ES, and creates a feature point file about feature point information. The created feature point file is recorded in a given address on the HDD 27 via the buffer control circuit 26 under control of the system controller 10. The SF extraction circuit 35 will be described in detail later.

In the present embodiment, IDE (intelligent drive electronics) is used as a protocol for the buffer control circuit 26 and HDD 27. The invention is not limited to this. Furthermore, in the present embodiment, an HDD is used as an example of recording medium. Other recording medium such as optical disc, magnetooptical disc, or solid-state memory may also be used.

Blocks used during reproduction and their functions are next described. The HDD 27 seeks for a given address under control of the system controller 10, reads out the TS, and supplies it to the buffer control circuit 26. The buffer control circuit 26 controls the buffer such that the TS sent in packets becomes continuous, and supplies the TS to the multiplex/demultiplex circuit 25. The multiplex/demultiplex circuit 25 extracts a packetized elementary stream (PES) from the TS and supplies it to an MPEG audio/video decoder 28.

The MPEG audio/video decoder 28 separates the supplied packetized ES into video ES and audio ES, which are supplied to an MPEG video decoder (not shown) and an MPEG audio decoder (not shown), respectively. The video and audio ES's are then decoded. As a result, video data and audio data in the baseband are obtained. The MPEG audio/video decoder 28 supplies the video data and audio data to video postprocessing circuit 29 and switching circuit 32, respectively. The MPEG audio/video decoder 28 as described later thins out the decoded data for altered-speed reproduction using the feature point file.

The video postprocessing circuit 29 switches between the video data from the MPEG audio/video decoder 28 and the video data from the video preprocessing circuit 20, combines them, or filters them. The postprocessing circuit 29 supplies video data to an on-screen display (OSD) 30. The OSD 30 performs processing for creating graphics for image display and superimposing the created graphics on video data or partially displaying the graphics. The processed video data are supplied to an NTSC encoder 31. The NTSC encoder 31 converts the supplied video data (digital component video data) into a Y/C signal and performs a D/A conversion, thus obtaining analog composite video signal and S-video signal.

On the other hand, the switching circuit 32 selects any one of the audio data from the MPEG audio/video decoder 28 and the audio data from the audio A/D converter 22 and supplies the selected data to an audio D/A converter 33. The audio D/A converter 33 converts the supplied audio data into an analog audio signal.

An external digital signal supplied from a digital IN/OUT 39 and a digital signal outputted to the outside from the digital IN/OUT 39 are next described.

For example, where digital data entered from an external IRD (integrated receiver decoder) via a digital interface such as an IEEE-1394 terminal are recorded, the digital data are entered into a digital interface circuit 24. The digital interface circuit 24 creates a TS by performing processing such as format conversion on the digital data such that the data match the present method. The TS is supplied to the multiplex/demultiplex circuit 25. The multiplex/demultiplex circuit 25 analyzes and creates a control signal, converts the control signal to a TS matched with the present method, and supplies the TS to the buffer control circuit 26. Since subsequent processing is the same as the foregoing processing, its description is omitted.

During reproduction, processing up to the multiplex/demultiplex circuit 25 is the same as the processing described above and so its description is omitted. If necessary, the multiplex/demultiplex circuit 25 analyzes and creates control signals, and supplies a TS to the digital interface circuit 24. The digital interface circuit 24 performs a conversion opposite to the conversion performed during recording to convert the data into digital data matched to an external IRD, and outputs the digital data. At the same time, the multiplex/demultiplex circuit 25 performs separating processing and supplies a packetized ES to the MPEG audio/video decoder 28. In consequence, analog video and audio signals can be obtained.

In the present embodiment, connection with an IRD has been described. Connection with an AV device such as a TV receiver and with a personal computer is also possible.

The functions used when digital broadcasts are recorded and reproduced using a digital tuner 36 are next described.

Where TS and ES sent in by a digital broadcast are reencoded by the MPEG video encoder 21 or MPEG audio encoder 23 and recorded without recording the TS and ES directly on the HDD 27, the TS output from the digital tuner 36 is supplied to the SF extraction circuit 35 and multiplex/demultiplex circuit 25 via the buffer control circuit 26, for the following reason. The TS that is a stream format, for example, of a digital broadcast is converted into a PS (program stream) format used for DVDs. Consequently, the data stream of the digital broadcast can be recorded on DVDs.

As described previously, the SF extraction circuit 35 parses the TS, extracts the SF from the audio ES, and creates a feature point file. The created feature point file is recorded in a given address on the HDD 27 via the buffer control circuit 26 under control of the system controller 10. SF extraction and creation of the feature point file are described later. With respect to the SF extraction and creation of the feature point file, description is omitted in the case described above where recording is made using an external IRD entered from the digital IN/OUT 39. However, in this case, the operation is the same as the operation performed when the analog tuner 14 or digital tuner 36 is used.

Returning to the original description, the multiplex/demultiplex circuit 25 extracts the PES (packetized elementary stream) from the TS supplied from the buffer control circuit 26 and supplies the PES to the MPEG audio/video decoder 28.

The MPEG audio/video decoder 28 separates the entered PES into video ES and audio ES and supplies them to MPEG video decoder and MPEG audio decoder, respectively. Decoding matched with the encoding method used in digital broadcasts is done. In the present embodiment, MPEG audio is taken as an example of the kind of audio ES of digital broadcasts. Other compression scheme is also available. As a result, image data and audio data in the baseband are obtained and supplied to the MPEG video encoder 21 and MPEG audio encoder 23, respectively.

The MPEG video encoder 21 performs MPEG video encoding, creates a video ES, and supplies the ES to the multiplex/demultiplex circuit 25. The MPEG audio encoder 23 performs MPEG audio encoding, creates an audio ES, and supplies it to the multiplex/demultiplex circuit 25.

The multiplex/demultiplex circuit 25 combines the entered MPEG video ES and MPEG audio ES, multiplexes them, creates a TS for the MPEG system, and supplies the TS to the buffer control circuit 26.

The buffer control circuit 26 controls the TS, which is entered continuously from the multiplex/demultiplex circuit 25, to send the TS in packets to the following stage of HDD 27, and records the TS on the HDD 27.

Meanwhile, where TS and ES which are sent in by a digital broadcast are directly recorded on the HDD 27 without reencoding them, the output in TS format from the digital tuner 36 is supplied to the SF extraction circuit 35 and HDD 27 via the buffer control circuit 26.

Also, in this case, the SF extraction circuit 35 similarly parses the TS, extracts the SF from the audio ES in the compression format used in the digital broadcast, and creates a feature point file. The created feature point file is recorded in given addresses on the HDD 27 via the buffer control circuit 26 under control of the system controller 10. The HDD 27 records the TS entered in packets from the buffer control circuit 26 and the feature point file on the HDD 27.

Figure 2:
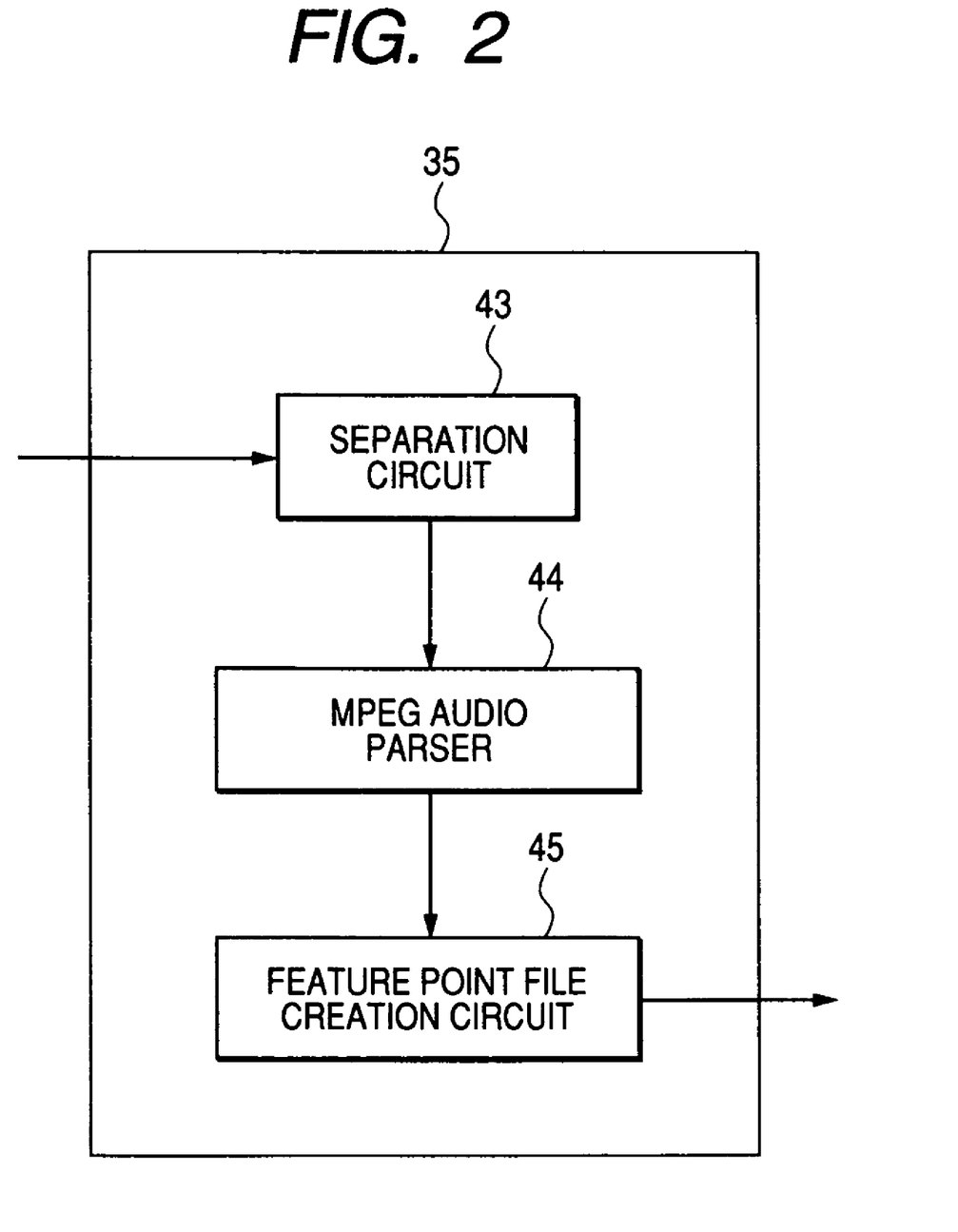
FIG. 2 is a block diagram showing the configuration of an SF extraction circuit.

FIG. 2 is a block diagram showing the configuration of the SF extraction circuit 35.

A separation circuit 43 separates the TS entered from the buffer control circuit 26, extracts the PES of the MPEG audio, and supplies the PES to an MPEG audio parser 44. That is, the separation circuit 43 has some of the functions of the multiplex/demultiplex circuit 25.

The MPEG audio parser 44 parses the PES of the MPEG audio entered from the separation circuit 43, extracts PTS (Presentation Time Stamp) indicating reproduction time from the PES, extracts the SF from each subband within the MPEG audio ES, and supplies them to the feature point file creation circuit 45.

The feature point file creation circuit 45 creates a feature point file about a collection of features of the audio contents from the PTS and SF entered from the MPEG audio parser 44. The audio contents include a period containing components of the vocal band, for example, of human voice, a voiced interval containing components of nonvocal band of sound other than human voice, and a silent interval containing no sound. The created feature point file is recorded in a given address on the HDD 27 via the buffer control circuit 26 under control of the system controller 10.

In the present embodiment, the contents of the feature point file stored indicate the period containing audio components and the silent period. It is also conceivable to intact store the SF within the MPEG audio ES, for example. The contents of the feature point file are not limited to features of audio contents as described in the present embodiment. The contents may also include simultaneously stored features of video contents and a feature indicating the presence or absence of a bilingual broadcast, for example.

Figure 3:
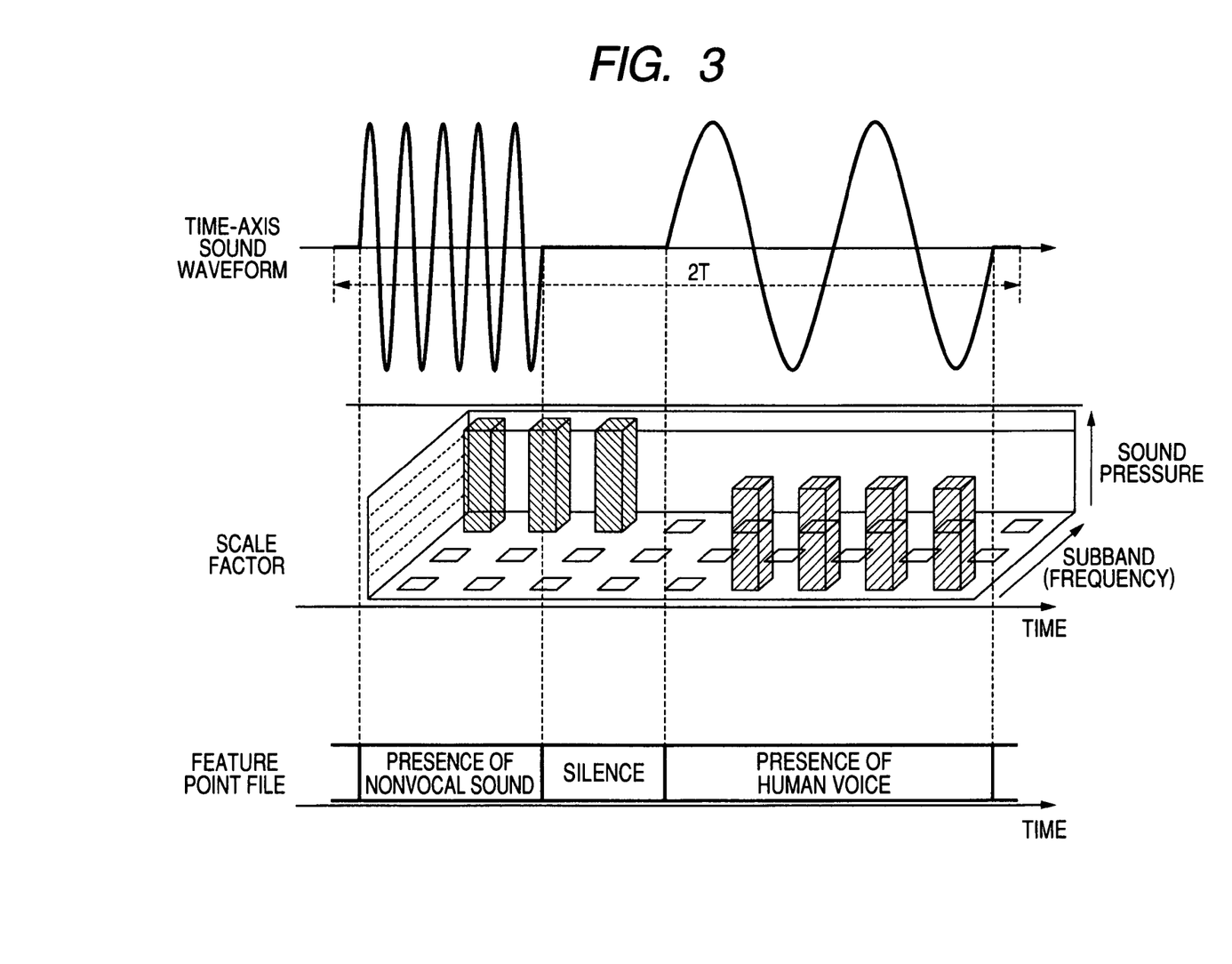
FIG. 3 is a diagram illustrating the relation between the SF (scale factor) in an MPEG audio ES treated by the SF extraction circuit and a feature point file.

FIG. 3 is a diagram illustrating the relation between the SF of the MPEG audio ES treated by the SF extraction circuit 35 and feature point files.

Three-dimensional bar graphs shown in the middle stage of FIG. 3 indicate SF values contained in MPEG audio ES's during a certain reproduction period of 2 T of FIG. 3 in certain subbands (frequency band) as an example. The horizontal axis indicates the time. The vertical axis indicates the sound pressure level given by SF. The axis extending obliquely from the left near side to the right deeper side indicates a subband. That is, SF values possessed by three certain subbands present in the periods corresponding to 9 audio frames have been plotted in three dimensions.

In FIG. 3, three subbands are shown. In a practical MPEG compliant system, there are 32 subbands. The number of subbands is not limited to these values. 2 T shown is about 10 seconds to 3 minutes, more preferably from about 30 seconds to 2 minutes, still further preferably about 1 minute. However, 2 T is not limited to these values.

The SF values shown at the middle stage of FIG. 3 have been calculated from the waveform shown at the top stage of FIG. 3. That is, sound waveform not yet undergone MPEG audio encoding is plotted at the top stage of FIG. 3 on the time axis, together with the SF values at the middle stage. In the former half of the time domain shown in the figure, there is sound having relatively high frequency components. In the latter half, there are relatively low frequency components. Since SF is taken to show the maximum sound pressure level within the frequency band possessed by each subband, the time-axis sound waveforms having relatively high frequency components in the former half are the three-dimensional rod graphs located on the deeper side at the middle stage of FIG. 3, i.e., are accumulations of SF values in the subbands to which relatively high frequency bands are assigned. Meanwhile, the time-axis waveforms having relatively low frequency components in the latter half are the three-dimensional rod graphs located on the nearer side at the middle stage of FIG. 3, i.e., accumulations of SF values in the subbands to which relatively low frequency bands are assigned. With respect to the example of the time-axis waveform at the top stage of FIG. 3, the former and latter halves have similar waveform amplitude. Therefore, the rods showing SF values at the middle stage of FIG. 3 have the same height (length) in both former and latter halves.

The bottom stage of FIG. 3 is a diagram showing how the feature point file creation circuit 45 extracts feature points from the SF values within the MPEG audio ES's shown at the middle stage of FIG. 3 and how the feature points are recorded as a feature point file on the HDD 27. The bottom stage has the same scale of time axis as the top and middle stages of FIG. 3. However, in the former half, the SF values in the subbands to which relatively high frequency components are assigned have increased values. Accordingly, the contents have relatively high frequencies of sound. The feature point file creation circuit 45 takes these SF values as "presence of nonvocal sound" having frequencies higher than the frequency band possessed by the human voice and stores information about the "presence of nonvocal sound" in locations corresponding to the reproduction interval within the feature point file.

There is an interval corresponding to 2 audio frames between the former half containing signals having relatively high frequency components and the latter half containing signals having relatively low frequency components. In this interval, the SF values in any subband have no amplitudes (i.e., the rod has no height). Therefore, the feature point file creation circuit 45 takes this interval as "silence" and stores the data in locations corresponding to the reproduction interval within the feature point file.

In the latter half, the subbands having relatively low frequency components have larger SF values (e.g., corresponding to 4 audio frames) and just match the frequency band possessed by the human voice. Accordingly, the feature point file creation circuit 45 takes the interval as "presence of human voice" and stores the data in locations corresponding to the reproduction interval within the feature point file.

In the present embodiment, it is assumed that the human "voice" has a fundamental frequency of about 70 to 350 Hz, for example, more specifically, from about 100 to 300 Hz. Frequencies lower and higher than the "voice" are taken as "nonvocal sound". The present invention is not limited to these ranges but rather the used range can be set at will. The system controller 10 discriminates between "presence of human voice", "presence of nonvocal sound", and "silence", using these frequency bands as threshold values. The threshold values for the frequency bands may be stored in the HDD 27, RAM 12, or ROM 11.

Information about the "presence of human voice", "presence of nonvocal sound", and "silence" created at given intervals of time (2 T described above) in this way is stored in the HDD 27 as a feature point file at the given intervals of time. In this case, each feature point file and encoded audio data from which the feature point file is created are made to correspond to each other by a table (not shown) and stored in the HDD 27.

In the present embodiment, the feature point file maintains the time relationship between the feature point file and the reproduction contents, the feature point file having feature points extracted by making use of PTS extracted from the PES. A management technique using other time information may also be used.

Furthermore, in the present embodiment, the presence or absence of audio sound is used as one reference in classifying various pieces of information stored in the feature point file, in order to preferentially reproduce human voice contained in the contents. The pieces of information can also be classified from other point of view.

Figure 4:
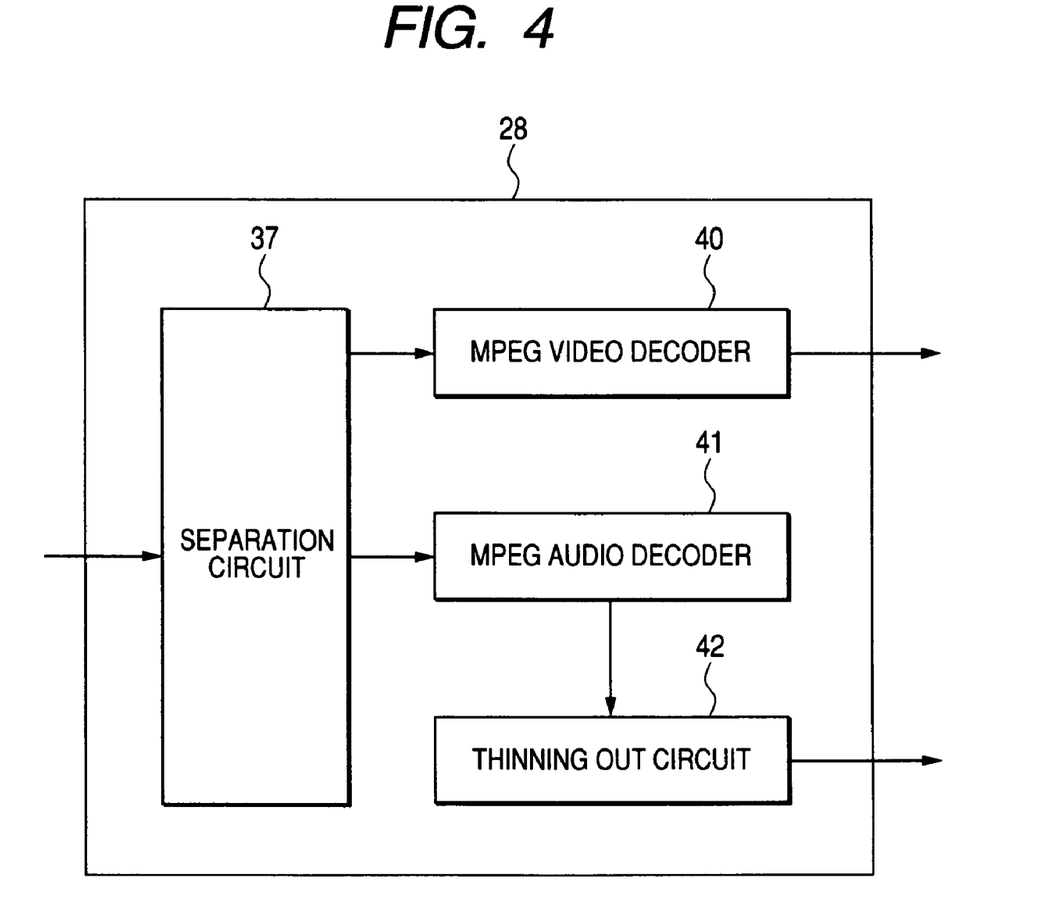
FIG. 4 is a block diagram showing the configuration of an MPEG audio/video decoder.

FIG. 4 is a block diagram showing the configuration of the MPEG audio/video decoder 28.

In the case of an altered-speed reproduction, for example, of double speed, PES streams are entered to the separation circuit 37 at the double input rate. In this case, the separation circuit 37 separates the streams into video ES and audio ES at the double processing speed compared with the speed used during normal reproduction (1× reproduction), and supplies the video ES and audio ES to an MPEG video decoder 40 and an MPEG audio decoder 41, respectively, at the double output rate. If the MPEG video decoder 40 does not perform normal reproduction operation nor operates at the double speed, the separation circuit 37 extracts only the portions used for altered-speed reproduction of double speed from the video ES under control of the system controller 10, and supplies the extracted portions to the MPEG video decoder 40. Video data in the baseband decoded by the MPEG video decoder 40 are supplied as output from the MPEG audio/video decoder 28 and as video data matched with the double-speed reproduction to the video postprocessing circuit 29. PCM data decoded by the MPEG audio decoder 41 at the double speed are supplied to a thinning out circuit 42 at the double output rate compared with the rate used during normal reproduction. The thinning out circuit 42 thins out the input audio data to a half rate while utilizing the feature point file read from the HDD 27 by the system controller 10. The thinning out circuit 42 supplies the thinned out audio data as the output from the MPEG audio/video decoder 28 to the switching circuit 32.

During normal speed reproduction, the thinning out circuit 42 does not thin out the PCM data supplied from the MPEG audio decoder 41 but supplies the data as the output from the MPEG audio/video decoder 28 to the switching circuit 32 at normal speed.

Figure 5:
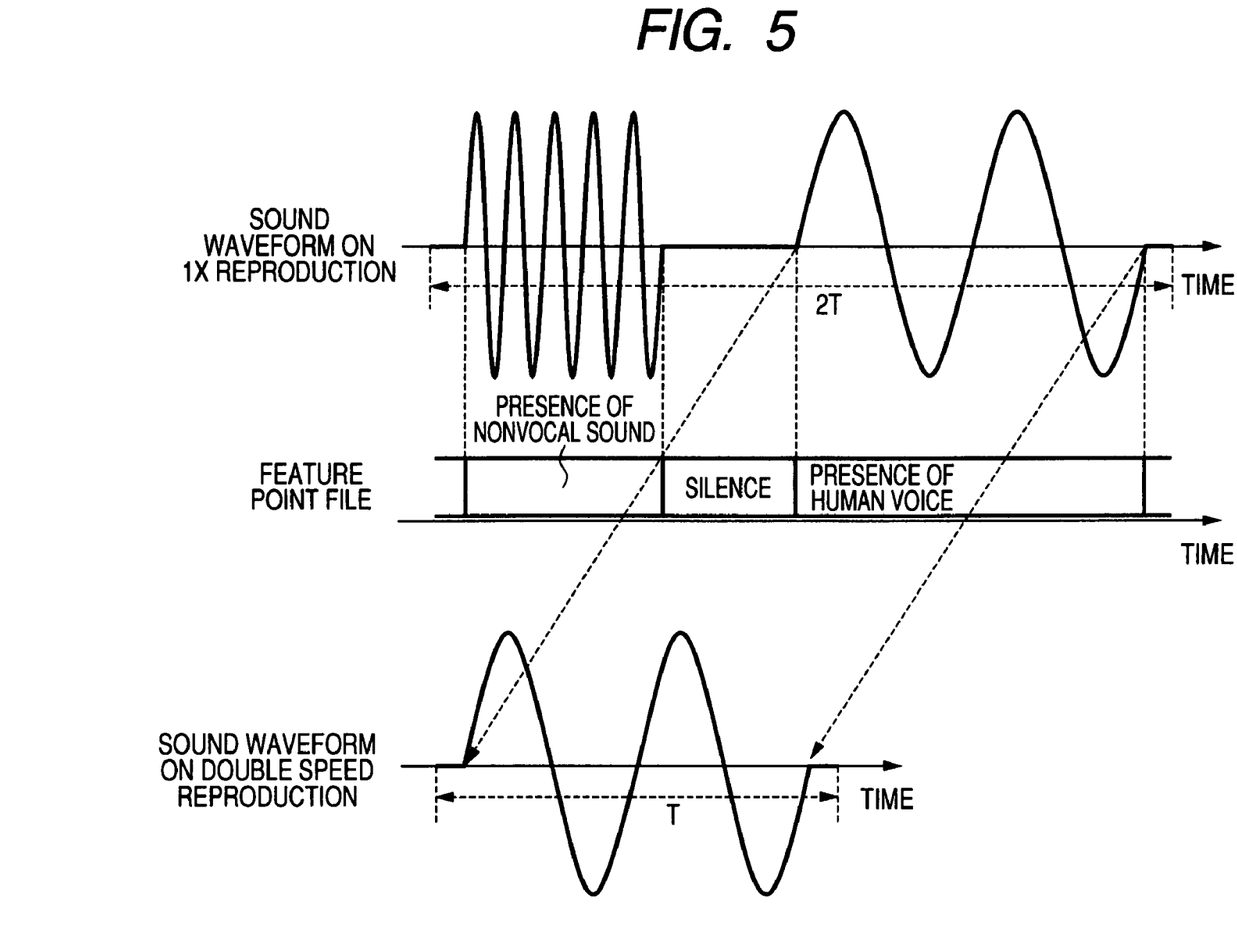
FIG. 5 is a diagram illustrating a method of realizing a double-speed reproduction by causing the thinning out circuit shown in FIG. 4 to utilize a feature point file which is created during recording and is stored in a HDD and to reproduce intervals including audio with priority.

FIG. 5 is a diagram illustrating a method of realizing double-speed reproduction by causing the thinning out circuit 42 to use the feature point file created during recording and stored in the HDD 27 and to reproduce intervals containing audio with priority.

The top stage of FIG. 5 shows the time-axis sound waveform during a certain period (2 T in the figure) in a case where a title of contents (e.g., a TV program) is reproduced at 1× speed. The middle stage of FIG. 5 shows the contents of a feature point file which was created when a title of content was recorded and is stored on the HDD 27, in conformity with the time-axis of the time-axis waveform at the top stage, in the same way as the bottom stage of FIG. 3. The contents of the feature point file, i.e., "presence of nonvocal sound", "silence", and "presence of (human) voice", have been created by the method illustrated in FIG. 3. The four vertical broken lines connecting the top and middle stages of FIG. 5 indicate that they have correlation with the time-axis sound waveform obtained by decoding (top stage of FIG. 5).

The bottom stage of FIG. 5 indicates the waveform of the sound reproduced when the thinning out circuit 42 reproduces the interval of "presence of voice" with priority at double speed by making use of the feature point file. Because the contents corresponding to the period of 2 T at the top stage of FIG. 5 are reproduced at double speed, it follows that the reproduction time is halved down to period T at the bottom stage of FIG. 5. The thinning out circuit 42 can discern the features of the contents corresponding to the period of 2 T at the top stage of FIG. 5 by referring to the feature point file at the middle stage of FIG. 5. Thus, the thinning out circuit 42 can preferentially reproduce scenes which contain human voice and seem to be important while coping with the required reproduction speed, i.e., double speed, by removing intervals of "silence" and intervals of "presence of nonvocal sound" and reproducing only the latter-half intervals of "presence of voice".

The present embodiment can be especially advantageously applied to programs, i.e., contents to be recorded, in which the contents of human voice may be essential to the programs, such as variety show programs, news programs, and English conversation programs. However, the invention is not limited to these programs, as a matter of course. The programs are not restricted to TV broadcasts. Of course, the programs can be radio broadcast programs.

As described so far, according to the present embodiment, the SF (scale factor) that is information about the characteristics of sound indicated by the original sound signal is extracted from the compressed and encoded audio data. Based on the extracted SF, a feature point file is created without having to perform decoding by the MPEG audio/video decoder 28. Thus, in the present embodiment, the amount of computation can be reduced compared with the related art method including performing decoding, then creating subband data, observing energies possessed by the subbands, and classifying features possessed by subintervals. Furthermore, even if other title of program recorded in the past is being reproduced, the SF of the contents of the presently recorded title can be extracted.

The present invention is not limited to the embodiment described so far. Rather, the invention can be modified variously.

In the description given above, altered-speed reproduction of double speed is taken as an example. However, the reproduction speed is not limited to double speed. For example, the reproduction speed may be 1.5 times speed, 4 times speed, 8 times speed, 10 times speed, or higher. Alternatively, the reproduction speed may be varied in steps according to user's settings. In addition, the reproduction speed may be varied automatically.

In the above-described embodiment, an example is given in which the interval of "presence of voice" is, by chance, half the total time (2 T) of the feature point file and matches double speed reproduction, for example, as shown at the top stage of FIG. 3, to facilitate understanding the illustration. Where almost all the period of 2 T is "presence of voice", if double-speed reproduction is performed, for example, the double-speed reproduction is accomplished by extracting SF values having higher sound pressure levels among the SF values with "presence of voice" in the feature point file and thinning out the SF values. Only one threshold value may be set for the sound pressure levels. Plural discrete threshold values may also be set.

For example, the invention is not limited to the method of reproducing intervals containing human vocal sound with priority as in the above-described embodiment. For example, an altered-speed reproduction method is conceivable in which unsilent intervals are reproduced with priority and only silent intervals are removed irrespective of whether the sound is human vocal sound. It is also conceivable to apply the present invention to a method of performing reproduction at an altered speed by thinning out data while taking account of the features of video contents.

Additionally, the timing at which a feature point file is created is not limited to the recording period. A method including reading out TS (transport streams) on the HDD once recording is completed and parsing the transport streams is also conceivable. Alternatively, if a recording medium having a high-speed readout rate, an SF extraction circuit having high-speed computational capabilities, and a system controller are used, a feature point file may be created instantly, i.e., on a real-time basis, when altered-speed reproduction is performed and used for thinning out during altered-speed reproduction.

It should be understood by those skilled in the art that various modifications, combinations, sub-combinations and alterations may occur depending on design requirements and other factors insofar as they are within the scope of the appended claims or the equivalents thereof.

The invention claimed is:

1. A data recording and reproducing apparatus adapted to receive audio data created by encoding an original sound signal and to decode the audio data into the original sound signal to thereby reproduce the original sound signal, the data recording and reproducing apparatus comprising:

data storage means for storing the audio data;
feature point information creation means for creating information about feature points by extracting information about characteristics of sound indicated by the original sound signal from the stored audio data and by creating feature point information based on the extracted information, in which the feature point information includes information representative of a number of intervals each indicative of a presence of a human voice, a presence of nonvocal sound, or silence, in which the nonvocal sound has an amplitude higher than zero and has a frequency higher than that of the human voice or lower than that of the human voice, and in which the silence has an amplitude of zero;

altered-speed reproduction means for reproducing at least a portion of the original sound signal at an altered speed by decoding the audio data and thinning out the decoded audio data based on the feature point information such that respective intervals corresponding to silence and the presence of nonvocal sound are removed so that only the portion or portions of the original sound signal representative of the interval or intervals having the human voice are reproduced at the altered speed; and feature point information storage means for storing the created feature point information in a manner corresponding to a time interval or intervals of the audio data having the information about the characteristics corresponding to the feature point information so as to enable a timed relationship to be maintained between the feature point information and reproduced sound signal or audio data.

2. The data recording and reproducing apparatus of claim 1, wherein the feature point information creation means creates the feature point information at given intervals of time.

3. A method of reproducing audio data by receiving the audio data, which have been created by encoding an original sound signal, and decoding the audio data into the original sound signal, the data recording and reproducing method comprising:

storing the audio data;

extracting information about characteristics of sound indicated by the original sound signal from the stored audio data;

creating feature point information based on the extracted information, in which the feature point information includes information representative of a number of intervals each indicative of a presence of a human voice, a presence of nonvocal sound, or silence, in which the nonvocal sound has an amplitude higher than zero and has a frequency higher than that of the human voice or lower than that of the human voice, and in which the silence has an amplitude of zero; decoding the audio data;

thinning out the decoded audio data based on the feature point information to reproduce at least a portion of the original sound signal at an altered speed while using the created feature point information such that respective intervals corresponding to silence and the presence of nonvocal sound are removed so that only the portion or portions of the original sound signal representative of the interval or intervals having the human voice are reproduced at the altered speed; and storing the created feature point information in a manner corresponding to a time interval or intervals of the audio data having the information about the characteristics corresponding to the feature point information so as to enable a timed relationship to be maintained between the feature point information and reproduced sound signal or audio data so as to enable a timed relationship to be maintained between the feature point information and reproduced sound signal or audio data.

4. A non-transitory computer readable storage memory having stored thereon a program adapted to cause a computer to execute a process of reproducing audio data by receiving the audio data, which have been created by encoding an original sound signal, and decoding the audio data into the original sound signal, the process comprising:

storing the audio data;

extracting information about characteristics of sound indicated by the original sound signal from the stored audio data;

creating feature point information based on the extracted information, in which the feature point information includes information representative of a number of intervals each indicative of a presence of a human voice, a presence of nonvocal sound, or silence, in which the nonvocal sound has an amplitude higher than zero and has a frequency higher than that of the human voice or lower than that of the human voice, and in which the silence has an amplitude of zero;

decoding the audio data;

thinning out the decoded audio data based on the feature point information to thereby reproduce at least a portion of the original sound signal at an altered speed while using the created feature point information such that respective intervals corresponding to silence and the presence of nonvocal sound are removed so that only the portion or portions of the original sound signal representative of the interval or intervals having the human voice are reproduced at the altered speed; and storing the created feature point information in a manner corresponding to a time interval or intervals of the audio data having the information about the characteristics corresponding to the feature point information so as to enable a timed relationship to be maintained between the feature point information and reproduced sound signal or audio data so as to enable a timed relationship to be maintained between the feature point information and reproduced sound signal or audio data.

5. A data recording and reproducing apparatus adapted to receive audio data created by encoding an original sound signal and to decode the audio data into the original sound signal to thereby reproduce the original sound signal, the data recording and reproducing apparatus comprising:

a data storage unit operable to store the audio data;

a feature point information creation unit operable to create information about feature points by extracting information about characteristics of sound indicated by the original sound signal from the stored audio data and to create feature point information based on the extracted information, in which the feature point information created by the feature point information creation unit includes information indicating a presence of a human voice, a presence of nonvocal sound, and silence, in which the nonvocal sound has an amplitude higher than zero and has a frequency higher than that of the human voice or lower than that of the human voice, and in which the silence has an amplitude of zero;

an altered-speed reproduction unit operable to reproduce at least a portion of the original sound signal at an altered speed by decoding the audio data and thinning out the decoded audio data based on the feature point information such that respective intervals corresponding to silence and the presence of nonvocal sound are removed so that only the portion or portions of the original sound signal representative of the interval or intervals having the human voice are reproduced at the altered speed; and feature point information storage unit operable to store the created feature point information in a manner corresponding to a time interval or intervals of the audio data having the information about the characteristics corresponding to the feature point information so as to enable a timed relationship to be maintained between the feature point information and reproduced sound signal or audio data.

6. The data recording and reproducing apparatus of claim 1, in which the human voice has a frequency in a range of about 70 to 350 Hz such that the frequency of the nonvocal sound is higher than 350 Hz or lower than 70 Hz.

7. The method of claim 3, in which the human voice has a frequency in a range of about 70 to 350 Hz such that the frequency of the nonvocal sound is higher than 350 Hz or lower than 70 Hz.

8. The memory of claim 4, in which the human voice has a frequency in a range of about 70 to 350 Hz such that the frequency of the nonvocal sound is higher than 350 Hz or lower than 70 Hz.

9. The apparatus of claim 5, in which the human voice has a frequency in a range of about 70 to 350 Hz such that the frequency of the nonvocal sound is higher than 350 Hz or lower than 70 Hz.

* * * * *